United States Patent
Yin et al.

(10) Patent No.: US 9,370,011 B2
(45) Date of Patent: *Jun. 14, 2016

(54) TECHNIQUES TO PROVIDE PHYSICAL RESOURCE ALLOCATION USING A TREE-BASED STRUCTURE AND COMMUNICATE A CHANNEL QUALITY INDICATOR

(71) Applicant: Intel Corporation, Santa Clara, CA (US)

(72) Inventors: Hujun Yin, San Jose, CA (US); Roshni Srinivasan, Palo Alto, CA (US); Sassan Ahmadi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/155,085

(22) Filed: Jan. 14, 2014

(65) Prior Publication Data

US 2014/0126524 A1     May 8, 2014

Related U.S. Application Data (62) Division of application No. 13/040,425, filed on Mar. 4, 2011, now Pat. No. 8,660,073, which is a division of application No. 11/562,498, filed on Nov. 22, 2006, now Pat. No. 7,924,809.

(51) Int. Cl.
| | |
|---|---|
| *H04L 5/00* | (2006.01) |
| *H04W 72/08* | (2009.01) |
| *H04L 1/00* | (2006.01) |
| *H04W 72/04* | (2009.01) |

(52) U.S. Cl.
CPC .............. *H04W 72/08* (2013.01); *H04L 1/0029* (2013.01); *H04L 5/006* (2013.01); *H04L 5/0007* (2013.01); *H04L 5/0037* (2013.01); *H04W 72/048* (2013.01); *H04W 72/087* (2013.01)

(58) Field of Classification Search
None
See application file for complete search history.

(56) References Cited

U.S. PATENT DOCUMENTS

| | | | |
|---|---|---|---|
| 7,924,935 B2 * | 4/2011 | Tong | ..................... H04L 1/0026 375/260 |
| 7,929,496 B2 | 4/2011 | Gorokhov et al. | |
| 8,660,073 B2 | 2/2014 | Srinivasan et al. | |

(Continued)

OTHER PUBLICATIONS

"Section 16.3.4 Downlink physical structure", Part 16: Air Interface for Broadband Wireless Access Systems, IEEE P802.16m/D9, Oct. 6, 2010, pp. 546-547.

(Continued)

*Primary Examiner* — Frank Duong
(74) *Attorney, Agent, or Firm* — Alpine Technology Law Group LLC (57) ABSTRACT

In a wireless network, simultaneous support of distributed and contiguous sub-carrier allocation may be accomplished in the same sub-frame or time zone. Techniques are described herein that can be used to allocate distributed and/or contiguous basic (physical) resource blocks to users by specifying a codebook index and parent node. Techniques are described herein that can be used to flexibly set a number of sub-channels over which a subscriber station indicates a channel quality indicator to a base station. Sub-channels may be represented as nodes and may be grouped to include a parent node and child nodes. By specifying a code book to use and a parent node, the channel quality indicator of the parent and children nodes can be indicated.

12 Claims, 7 Drawing Sheets

(56) References Cited

U.S. PATENT DOCUMENTS

| | | | |
|---|---|---|---|
| 8,842,514 B2 * | 9/2014 | Zhang | H04W 72/0453 370/208 |
| 2005/0064872 A1 | 3/2005 | Osseiran et al. | |
| 2005/0201331 A1 | 9/2005 | Gaal et al. | |
| 2006/0034244 A1 | 2/2006 | Huang et al. | |
| 2007/0060178 A1 * | 3/2007 | Gorokhov et al. | 455/506 |
| 2008/0056117 A1 | 3/2008 | Muharemovic et al. | |
| 2009/0060081 A1 | 3/2009 | Zhang et al. | |

OTHER PUBLICATIONS

"Section 16.3.6.2.5.3 MIMO feedback modes", Part 16: Air Interface for Broadband Wireless Access Systems, IEEE P802.16m/D9, Oct. 6, 2010, pp. 717-720.

* cited by examiner

TECHNIQUES TO PROVIDE PHYSICAL RESOURCE ALLOCATION USING A TREE-BASED STRUCTURE AND COMMUNICATE A CHANNEL QUALITY INDICATOR

CROSS-REFERENCE TO RELATED APPLICATIONS

The present application is a divisional of U.S. application Ser. No. 13/040,425 filed Mar. 4, 2011 (pending), which in turn is a divisional of U.S. application Ser. No. 11/562,498 filed Nov. 22, 2006, now U.S. Pat. No. 7,924,809. Said application Ser. No. 13/040,425 and said application Ser. No. 11/562,498 are hereby incorporated herein by reference in their entireties.

FIELD

The subject matter disclosed herein relates to techniques to provide physical resource allocation using a tree-based structure and communicate a channel quality indicator.

BACKGROUND

Wireless access networks that use a multi-carrier access technique, such as orthogonal frequency division multiple access (OFDMA), allow the sub-channels and time-slots of a frame to be assigned to several users. Sub-channel quality and achievable throughput for each user may vary over time. Channel quality indicator (CQI) is a measure of sub-channel quality. Sub-channels may be allocated to users based on a variety of factors including but not limited to CQI. For example, CQI can be used to determine an appropriate modulation and coding scheme (MCS) to be applied to signals transmitted to a receiver. Communication of CQI uses bandwidth that could otherwise be used to communicate other information such as data. It is desirable to accurately communicate CQI while taking into account limitations of available bandwidth.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

In accordance with some embodiments, techniques are provided that are capable of identifying available basic resource blocks, determining possible tree structures for the basic resource blocks, selecting one or more tree structure from the possible tree structures, storing the one or more selected tree structure in a codebook, and allocating one or more basic resource block to a subscriber by indicating a code-book index and parent node.

In accordance with some embodiments, techniques are provided that are capable to selectively determine a channel quality indicator over a group of one or more sub-channel in response to receipt of a request to determine channel quality indicator for the group and to transmit the determined channel quality indicator. In accordance with some embodiments, bandwidth allocable to transmission of channel quality indicator is adjustable based in part on a number of sub-channels in the group. In accordance with some embodiments, the request to determine channel quality indicator includes identification of a codebook. In accordance with some embodiments, the request to determine channel quality indicator includes identification of a parent node of the group.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11 h, 802.11i, 802.11n, 802.16, 802.16d, 802.16e, and 802.16m standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth™, ZigBee™, or the like. Embodiments of the invention may be used in various other apparatuses, devices, systems and/or networks.

Resource allocation in OFDMA systems such as but not limited to 802.16e, 802.16m, or Third Generation Partnership Project (3GPP) LTE may involve assignment of groups of sub-carriers which are referred to as sub-channels (802.16e) or chunks (LTE) in frequency and symbols or groups of symbols which referred to as slots (802.16e) or sub-frames (LTE) in time. A subscriber station receiver may measure channel quality of transmitted resource blocks and provide channel quality indicator (CQI) to the base station, thereby allowing the base station scheduler to take advantage of channel variations in both time and frequency.

Two approaches to organize sub-carriers into sub-channels include (1) distributed or diversity sub-carrier permutation and (2) contiguous sub-carrier permutation. Both types of sub-channelization schemes are supported at least in 3GPP LTE and are defined as Worldwide Interoperability for Microwave Access (WiMAX). WiMAX indicates compliance at least with IEEE 802.16 (2001). Under WiMAX, adaptive coding and modulation sub-channels may use contiguous allocation whereas partially used sub-carriers (PUSC) and fully used sub-carriers (FUSC) schemes may use distributed permutation. Other approaches to organize sub-carriers to sub-channels may be used such as but not limited to Optional Partial Usage of Subchannels (OPUSC) and Tile Usage of Sub Channels (TUSC).

Under the distributed sub-carrier permutation approach, different sub-carriers are pseudo-randomly distributed or evenly spaced across the channel bandwidth. The distributed sub-carrier permutation may maximize frequency diversity and average out inter-cell interference. This scheme may be useful for a mobile environment where channel characteristics change fast.

Under the contiguous sub-carrier allocation approach, a sub-channel is a contiguous block of sub-carriers which can be adaptively selected by the base station scheduler. Sub-carriers with the highest signal-to-interference-plus-noise ratio (SINR) may be chosen, and sub-carriers in deep fades may be avoided. This approach may allow frequency selective scheduling, and may work well with beam-forming. A possible limitation of this approach may be that relatively stable conditions are desirable, where the characteristics of the channel change slowly such as with low-speed or nomadic usage.

Because both allocation schemes have their advantages depending on the subscriber mix and quality of service (QoS) needs, it may be desirable to support both types of sub-channelization schemes simultaneously to allow operation under different channel conditions.

CQI feedback may be simple when only one sub-channelization scheme is supported in a given subframe (e.g., LTE) or time zone (e.g., WiMAX). In such case, CQI feedback for every chunk or sub-channel corresponds to the sub-channelization scheme signaled for the entire time zone. In order to accommodate users of varying mobility and channel profiles in the same time zone or subframe, CQI feedback information may identify the sub-channel and time slot that is being allocated and also the sub-channelization scheme. This information may provide the base station greater flexibility in guaranteeing QoS for delay sensitive applications for subscribers with both low and high mobility. For example, in order to report the CQI for a specific sub-channel, the CQI may be sent with the sub-channel index. As the bandwidth and the number of sub-channels increases, the number of bits required to signal the sub-channel index increases. Due to bandwidth limitations, it may be necessary to limit the number of bits provided from a subscriber station to a base station in connection with communication of a CQI.

Figure 1:
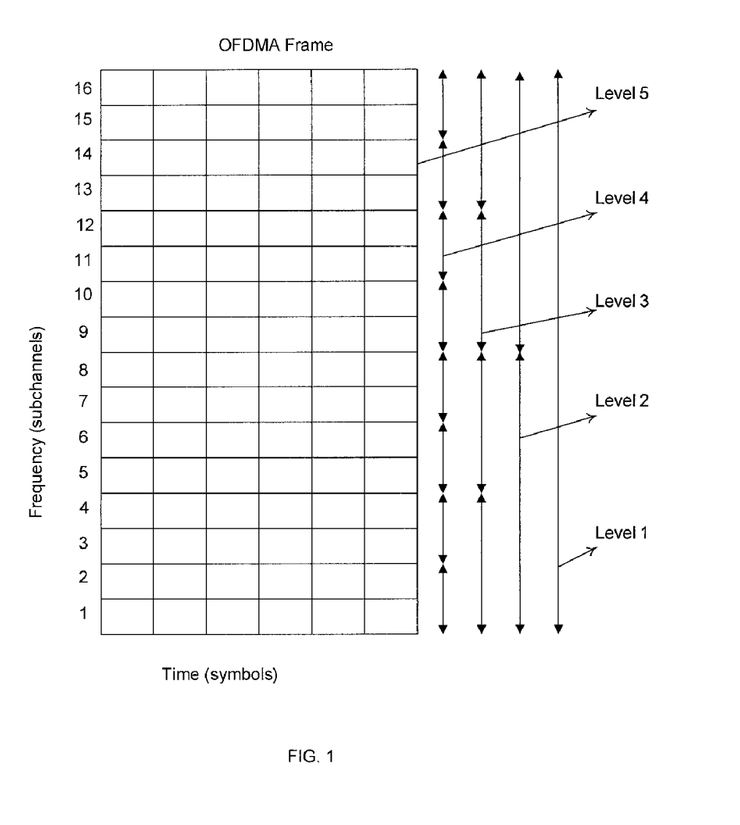
FIG. 1 shows an example of partitioning of sub-carriers that span a system bandwidth into sub-channels, in accordance with some embodiments of the present invention.
Figure 2:
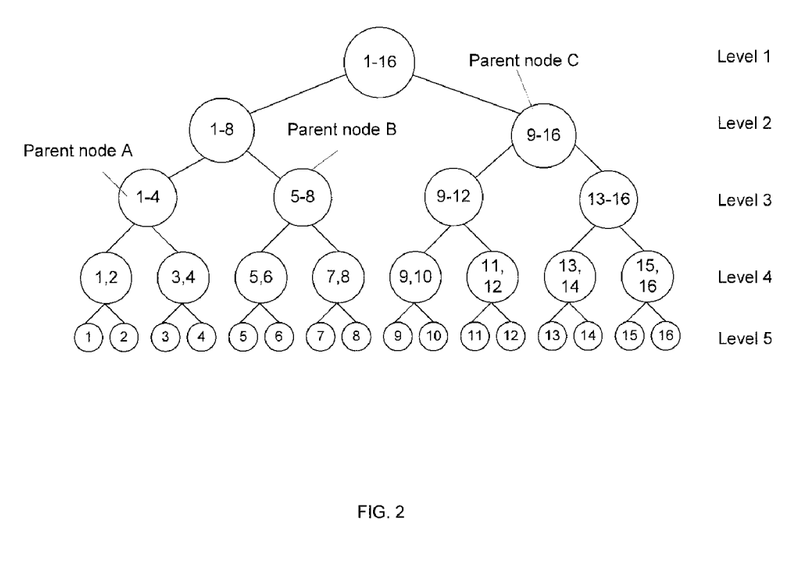
FIG. 2 depicts a tree representation of sub-channel blocks, in accordance with some embodiments of the present invention.

In accordance with some embodiments of the present invention, techniques are provided to permit flexible selection of granularity of CQI feedback reporting in systems that support at least contiguous or distributed sub-carrier allocation. For simplicity, assume that a resource block spans the entire OFDMA frame duration in time, although the resource block need not span the entire OFDMA frame duration in time. FIG. 1 shows an example of partitioning of sub-carriers that span a system bandwidth into 16 sub-channels. FIG. 2 depicts a tree representation of sub-channel blocks as nodes. The base station may partition the total available sub-carriers into two sets: one set for distributed allocation and one set for contiguous allocation. A base station may define a collection or group of sub-carriers localized in time and frequency (i.e., one-dimensional physical resource blocks) as one or more codebook and allocate one or more codebook physical resource blocks to at least one subscriber station in the network. In the codebook, a group of contiguous or distributed physical resource blocks can be assigned to a specific user in an uplink to the base station or downlink from the base station at any time. For example, each node under a parent node may use the same sub-channelization scheme (e.g., distributed or contiguous). Each parent node has two child nodes in a binary tree structure. The nodes at the bottom of the tree represent the actual physical resource blocks that could be either contiguous or non-contiguous. The smallest resource block may define the lowest level in the tree. The smallest resource block may define the physical resource and may be equivalent to a sub-channel. In the tree, the parent node may be an aggregation of basic resource blocks under this parent.

In accordance with some embodiments, such a unified sub-channel organization may have at least one or more of the following properties: (1) simultaneous support of distributed and contiguous sub-carrier allocation in the same OFDM(A) subframe or time zone and (2) flexible partitioning between distributed and contiguous sub-channels depending on the mobility of the subscriber such that the number of sub-channels with distributed and contiguous sub-channels can be changed dynamically depending at least on the mobility of the subscribers.

In some embodiments, a unified CQI feedback signaling scheme can be used for both distributed and contiguous sub-carrier allocation of varying granularities to control CQI feedback scheduling overhead. In some embodiments, to request a CQI for one or more node, the base station may identify a codebook to use and a parent node in the codebook. In some embodiments, the CQI reported at the parent node can be used as an approximation of the CQI of all the sub-channels at the corresponding terminal branches (e.g., child nodes). The number of child nodes under a parent node can be configured dynamically to adapt at least to the number of subscribers, the channel conditions, and feedback constraints. The more nodes a CQI represents, the less bandwidth may be used to communicate CQI of the parent and child nodes.

For the example of FIG. 2, when the feedback granularity is 1 sub-channel, there are 16 CQI feedback values for each user in every frame. The channel can be either frequency selective or flat. With flat fading, all sub-carriers that form a sub-channel can be assumed to have the same fading characteristics. When the channel is flat across more than one sub-channel, this may allow aggregation of CQI with coarser granularity. If the channel is approximately flat (i.e., a frequency non-selective channel) across more than one sub-channel, the CQI overhead can be reduced by aggregating the CQI corresponding to sub-carriers of two or more sub-channels into one value. For example, when the feedback granularity is 2, 4, 8 and 16 sub-channels, the CQI feedback overhead may be reduced to respective 8, 4, 2 and 1 CQI feedback value for each user in every frame. Although not a necessary feature of any embodiment, flexibility to reduce the amount of CQI feedback for multiple sub-channels may permit flexibility to modify bandwidth allocated for CQI feedback.

In the example of FIG. 2, different CQI feedback granularities are applied to physical resource blocks. For example, a CQI provided for parent node A also represents CQI for 6 child nodes under parent node A. For example, a CQI provided for parent node B also represents CQI for 6 child nodes under parent node B. For example, a CQI provided for parent node C also represents CQI for 14 child nodes under parent node C. In this example, the number of CQI values reported per user is reduced from 16 values per frame to 3 values per frame. Other levels of granularity may be applied such that a CQI of a parent node may represent CQI of any number of children nodes. Therefore, the CQI reported at the parent node can reflect the CQI of all the sub-channel groups (the physical resource blocks) at the corresponding child nodes.

For example, a CQI for distributed sub-carriers can be represented by an average CQI over all sub-carriers that form a resource block. In the case of contiguous sub-carrier allocation, CQI can be reported on each individual sub-channel, or a group of sub-channels with similar channel response depending on the available CQI bandwidth and channel frequency selectivity. The CQI for contiguous sub-carriers can be assumed to be the average CQI of the set of sub-carriers that form the resource block. For a given amount of spectrum, sub-carrier spacing is fixed and the number of sub-carriers per sub-channel may also be fixed. This may help identify the sub-channel, constituent sub-carriers, and the center subcarrier.

In some embodiments, although not a necessary feature of any embodiment, flexible bandwidth allocation of bandwidth used for CQI feedback can significantly improve uplink and downlink system capacity and QoS of OFDMA based systems such as current and next generation of mobile WiMAX and 3GPP LTE.

In some embodiments, although not a necessary feature of any embodiment, improved frequency diversity and interference averaging may result at the expense of frequency selective scheduling gain. In some embodiments, CQI feedback can be applied to contiguous sub-channels at different levels of granularity for optimal trade off between scheduling gain and feedback overhead.

For example, because distributed sub-channelization uses significantly less feedback overhead, CQI feedback can begin with distributed sub-channelization over all available sub-carriers. If feedback overhead is within acceptable limits, some sub-channels can be allocated with contiguous sub-carriers and this number of such sub-channels can be increased to facilitate subscribers to opportunistically take advantage of frequency selective scheduling gain. Other sub-channel allocation schemes can be used to take advantage of flexible bandwidth allocation to CQI.

Figure 3A:
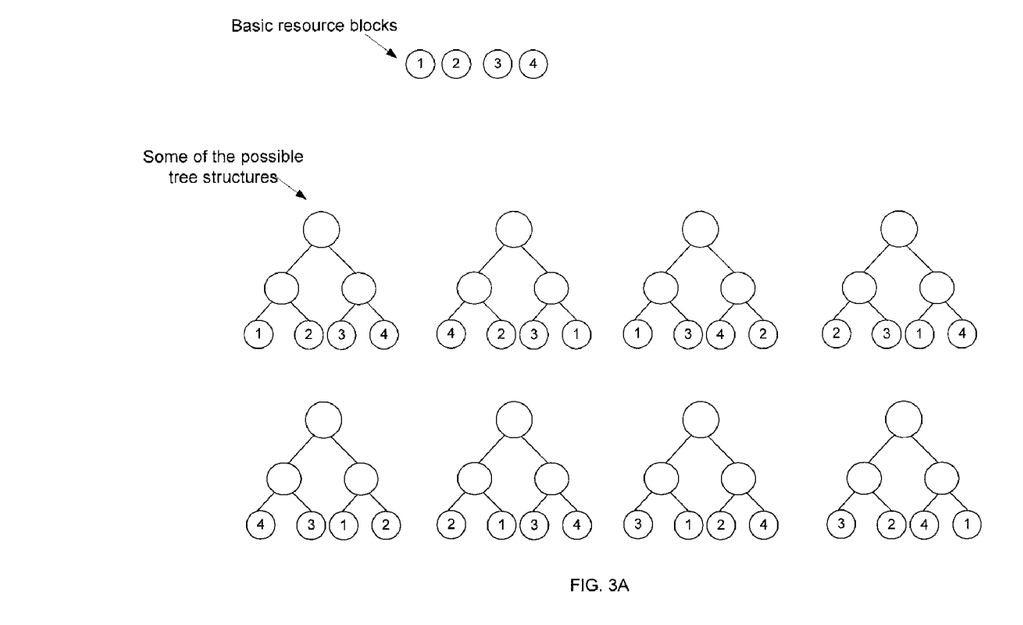
FIGS. 3A and 3B depict examples to allocate physical resource blocks to one or more users, in accordance with some embodiments of the present invention.
Figure 3B:
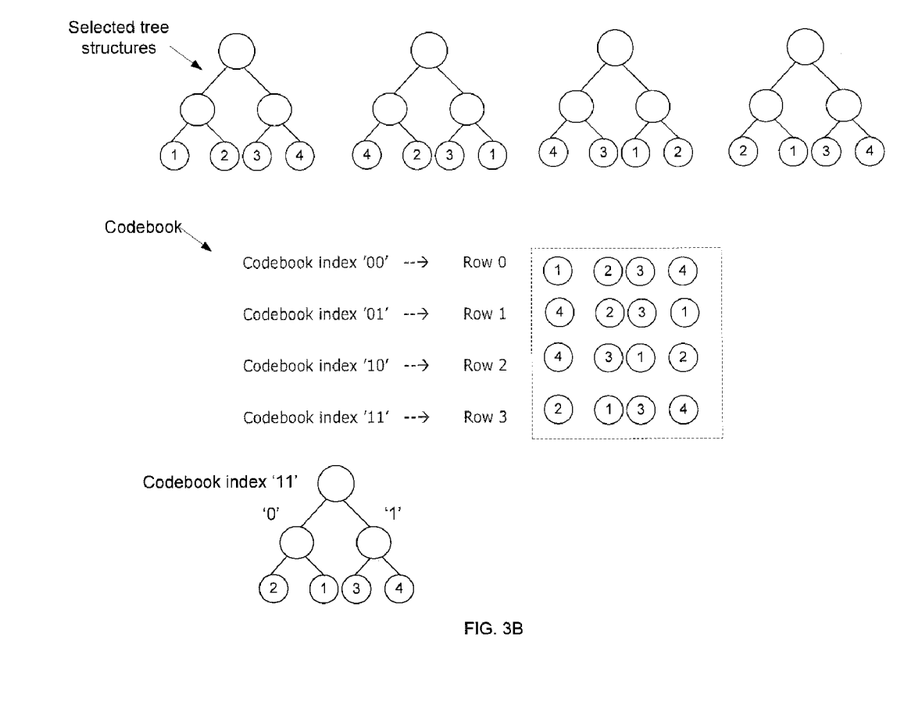

FIGS. 3A and 3B depict examples of tree-based resource allocation, in accordance with some embodiments of the present invention. This example refers to an L level tree structure, where L is 3, and each codebook has $2^K$ entries, where K is 2. Other sizes of tree structures and number of entries in a code book can be used. Referring to FIG. 3A, in this example, $2^{L-1}$ (four) basic resource blocks can be allocated to mobile users. The blocks are labeled 1-4. Basic resource blocks can be spread over the entire bandwidth to overcome the frequency-selectivity of the communication channel and utilize frequency selective scheduling. Given that L is 3, the possible tree structures are $(2^{L-1})!$, which is 24. Eight of the 24 possible tree structures are shown in FIG. 3A.

A small percentage of the $(2^{L-1})!$ possible tree structures may be useful. Therefore, if $2^K$ of the pre-determined candidate permutations are selected for use where $2^K \ll (2_{L-1})!$ then a codebook of size $2^K \times (2^{L-1})$ can be constructed.

In this example, K is selected to be 2, and accordingly, $2^K$ of the possible tree structures are selected and stored in a codebook. FIG. 3B depicts four selected tree structures. The selection of the tree structures can be random or based on certain criteria used by the base station scheduler such as consideration of user mobility as well as other factors. An example codebook is shown in FIG. 3B. The codebook can be arranged such that each row of the codebook includes one of the selected tree structures. Therefore, the ith row ($i=0,1,\ldots,2^{K-1}$) of the codebook refers to one of the selected tree structures shown. Each row of the codebook may correspond to a unique code book index.

Allocation of resource blocks can be made by identifying which tree structure to use by identifying a codebook index (i.e., the row number of the codebook) and by identifying a parent node of the tree structure that contains basic resource blocks that are assigned to the user. A parent node index may be used to identify the parent node in the tree.

As an example, to assign blocks 3 and 4 from the tree structure having codebook index '11' shown in FIG. 3B to a user, the specified codebook index is '11' and the specified node index is '1'. Therefore, the '11'+'1' specify the basic resource blocks numbered 3 and 4 that are assigned to that mobile station. The mobile station has the same codebook as the base station and the mobile station understands how to find and process the allocated basic resource blocks using the codebook index and node index.

The codebook can be populated by pseudo-randomly selected candidate permutations from the set of all possible permutations and the codebook index can further be randomly selected (a frequency hopping pattern). This special case may provide frequency diversity.

Figure 4:
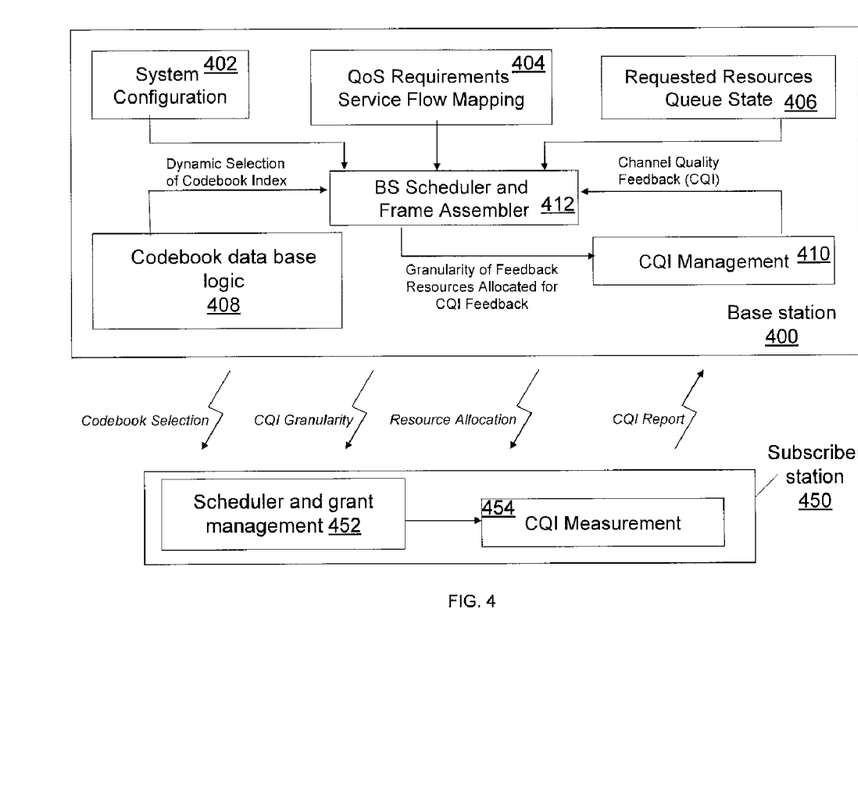
FIG. 4 depicts an example system that includes a base station and subscriber station, in accordance with some embodiments of the present invention.

FIG. 4 depicts an example system that includes base station 400 and subscriber station 450, in accordance with some embodiments. For simplicity, only one subscriber station is shown, but the system can include multiple subscriber stations that are similar to subscriber station 450. For example, the system may be a wireless access network that uses a multi-carrier access technique such as but not limited to OFDM or OFDMA.

In any OFDMA system, the format of sub-carrier organization (e.g., distributed or contiguous) may be explicitly broadcasted by base station 400 to all subscribers. In some embodiments, base station 400 can dynamically change the granularity of CQI feedback and the sub-channelization scheme for every sub-channel depending at least on subscriber mobility and load on the system. Base station may communicate such changes to subscriber stations.

In some embodiments, base station 400 may include system configuration logic 402, QoS requirements and service flow mapping logic 404, requested resources and queue state logic 406, code book data base logic 408, CQI management logic 410, and base station (BS) scheduler and frame assembler logic 412.

System configuration logic 402 may indicate one or more sub-channel for which CQI is to be measured. QoS requirements and service flow mapping logic 404 may maintain information related to quality of service and service flow for subscribers in a network. Requested resources and queue state logic 406 may manage rates downlink and uplink bandwidth allocated to subscribers. Codebook database logic 408 may dynamically select a codebook based on balance of many factors including but not limited to resources available and QoS requests. CQI management logic 410 may generate a message to be transmitted to a subscriber station to request CQI feedback from one or more subscriber station for one or more sub-channel based in part on bandwidth allocated for use to provide CQI feedback.

Base station (BS) scheduler and frame assembler logic 412 may allocate bandwidth based on subscriber needs. BS scheduler and frame assembler logic 412 may allocate a region in a subframe for each unique subscriber station. BS scheduler and frame assembler logic 412 may indicate a location of a region in a subframe allocated for a subscriber station. BS scheduler and frame assembler logic 412 may set the bandwidth available for uplink communication from a subscriber station to a base station and vice versa. For example, to increase bandwidth of data on uplink, BS scheduler and frame assembler logic 412 may reduce bandwidth allocated to communication of CQI. For example, to reduce bandwidth allocated to communication of CQI, BS scheduler and frame assembler logic 412 may reduce the granularity of CQI feedback. BS scheduler and frame assembler logic 412 may provide frames for transmission to subscriber station 450.

Base station 400 may transmit to subscriber 450 a codebook selection signal, CQI granularity signal, and resource allocation signal. Codebook selection signal may indicate a codebook to use. For example, base station may provide to each subscriber station $2^K$ codebooks, where k is a number of bits in codebook selection signal. The codebook selection signal may indicate the codebook among the available codebooks to use. The CQI granularity signal may indicate the parent node for which a subscriber station is to make a CQI measurement. In some embodiments, all nodes under the parent node use the same sub-channelization scheme as the parent node. In some embodiments, the base station may take the CQI of nodes under the parent as having the same CQI as reported for that of the parent. Resource allocation signal may indicate to the subscriber station where data is located in a received frame.

Subscriber station 450 may include scheduler and grant management logic 452 and CQI measurement logic 454. Subscriber station 450 may store one or more codebook provided by a base station. Based on an identified codebook in a codebook selection signal, subscriber station 450 may select a codebook for use. The codebook may indicate sub-carrier allocation and channelization techniques used for each sub-carrier. To reduce the complexity of the codebook search, the codebook entries may be structured in a pre-determined pattern such that depending on the desired permutation scheme, the appropriate codebook index can be determined. The first entry of the codebook however may be the non-permuted physical resource block index used for localized physical resource assignments.

Based on the parent node identified in a CQI granularity signal and the sub-channels associated with the parent node and sub-channelization scheme indicated by the identified codebook, subscriber station 450 may measure a CQI at least for the parent node and the related child nodes. When a parent node and related child nodes use a distributed sub-channelization scheme, a common channel quality indicator over the specified group of a parent node and related child nodes may represent a CQI for a parent node and related child nodes. When a parent node and related child nodes use a contiguous sub-channelization scheme, a CQI measurement of approximately a center sub-channel of the group may represent the common CQI for a parent node and related child nodes, but the CQI measurement of the group is not limited to this measurement. Any techniques may be used to measure channel quality indicator, such as but not limited to Signal to Interference-plus-Noise Ratio (SINR) measurements, Modulation and Coding Scheme (MCS) option selection, and instantaneous rate feedback.

Subscriber station 450 may indicate the CQI to base station 400 by transmitting a CQI report signal. The manner by which CQI is reported may comply with applicable standards such as but not limited to SINR measurements, Modulation and Coding Scheme (MCS) option selection, and instantaneous rate feedback.

Figure 5:
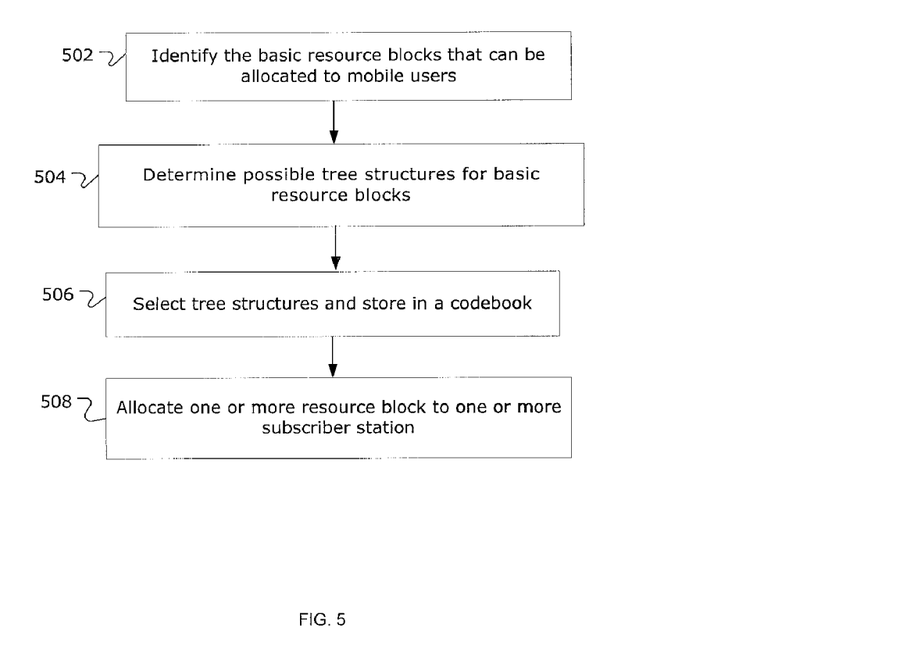
FIG. 5 depicts a process that can be used to allocate blocks to one or more user, in accordance with some embodiments of the present invention.

FIG. 5 depicts an example process that can be used to allocate resource blocks, in accordance with some embodiments of the present invention. Block 502 may include identifying basic resource blocks that can be allocated to one or more mobile subscriber station. For example, the number of basic resource blocks may depend on the number of levels in a tree structure. For example, $2^{L-1}$ resource blocks may be available, where L is a number of levels in a tree structure.

Block 504 may include determining possible tree structures for the basic resource blocks. For example, the number of possible tree structures for the basic resource blocks may be $(2^{L-1})!$ where L is a number of levels in a tree structure.

Block 506 may include selecting tree structures and storing the tree structures in a codebook. For example, a code book may be set to have $2^K$ entries. For example, a tree with L levels may have $(2^{L-1})!$ possible tree structures. A small percentage of the $(2^{L-1})!$ possible tree structures may be useful. $2^K$ of the pre-determined candidate permutations may be selected for use, where $2^K << (2^{L-1})!$. The selection can be random or based on certain criteria used by the base station scheduler such as but not limited to consideration of user mobility.

The code book can be arranged such that each row of the codebook includes one of the selected tree structures. Each row of the codebook may correspond to a unique code book index. The code book can be communicated by a base station to one or more subscriber station.

Block 508 may include allocating one or more resource block for use by one or more subscriber station. To allocate one or more resource block, a tree structure and parent node in the tree may be identified. A tree structure to use may be identified by identifying a codebook index (i.e., the row number of the codebook). A parent node of the tree structure contains basic resource blocks that are assigned to the user.

Figure 6:
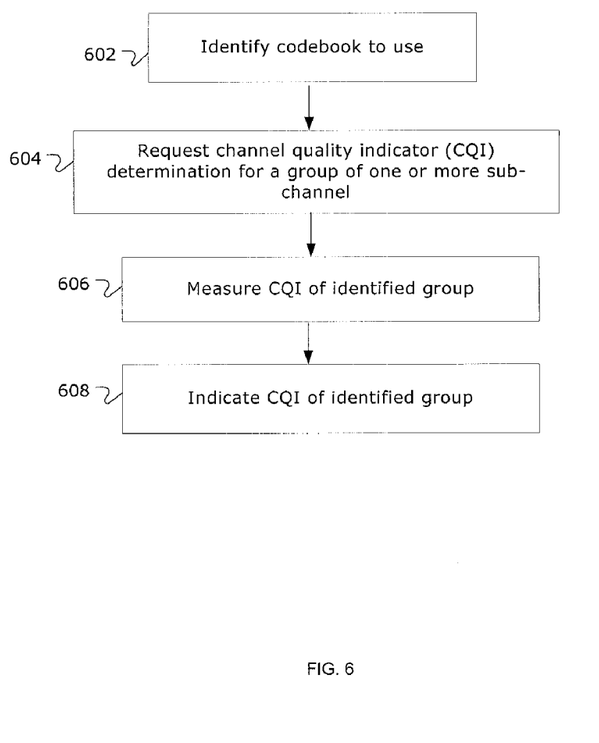
FIG. 6 depicts an example process that can be used to identify a channel quality indicator of one or more sub-channel, in accordance with some embodiments of the present invention.

FIG. 6 depicts an example process that can be used to identify a CQI of one or more sub-channel, in accordance with some embodiments of the present invention. In block 602, a base station may identify a codebook to use. The base station has flexibility to allocate sub-channels to use any sub-channelization scheme such as but not limited to distributed or contiguous. The codebook may specify a sub-channelization scheme to use for a sub-channel. Sub-channels may be grouped in a tree arrangement. Sub-channels that use similar sub-channelization schemes may be grouped together.

In block 604, base station may request channel quality indicator determination for a group of one or more sub-channel. For example, the base station may request measurement of channel quality indicator of one or more sub-channel by specifying a parent node. In some embodiments, sub-channels may be accessible in a code-book in a tree arrangement as nodes. A parent node may have two or more child nodes. A subscriber station may determine whether a channel quality indicator is to be determined for one or more nodes by determining whether there are any nodes under the parent node. In some embodiments, the granularity of channel quality index may be identified by whether the parent node includes any child nodes. In some embodiments, a channel quality indicator provided for the parent may represent channel quality of child nodes.

In block 606, a subscriber station may measure CQI of the identified group. For a parent node and related child nodes (if any) that use a distributed sub-channelization scheme, a common channel quality indicator over the specified group of sub-channels may be a CQI for the parent node and related child nodes. For a parent node and related child nodes (if any) that use a contiguous sub-channelization scheme, a CQI measurement of a center sub-channel of the group may be the common CQI for the parent node and related child nodes, but the CQI measurement of the group is not limited to this measurement. CQI measurement techniques may include but not limited to SINR, MCS option selection, and instantaneous rate feedback.

In block 608, the subscriber station may report a CQI of the identified group to the base station. The format of the CQI report signal may be in compliance with applicable standards such as but not limited to SINR, MCS option selection, and instantaneous rate feedback.

Embodiments of the present invention may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the functions of any flow diagram need not be implemented in the order shown; nor do all of the functions necessarily need to be performed. Also, those functionalities that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A non-transitory computer readable medium comprising instructions stored thereon which when executed by a computer, cause the computer to:
   request a channel quality indicator (CQI) determination over a group of one or more sub-channel;
   selectively adjust sub-channelization allocation for one or more sub-channels based in part on a received determined channel quality indicator, wherein the determined channel quality indicator represents a CQI of the group, and wherein the sub-channels comprise contiguous sub-carriers and distributed sub-carriers existing simultaneously in a sub-frame or time zone; and
   increase a number of contiguous sub-carriers if feedback overhead is within an acceptable limit.

2. The computer readable medium of claim 1, wherein to request a channel quality indicator comprises identification of a codebook.

3. The computer readable medium of claim 1, wherein to request a channel quality indicator comprises identification of a parent node.

4. The computer-readable medium of claim 1, further comprising instructions which when executed by a computer, cause the computer to:
   provide a codebook of sub-channelization allocations based in part on any of the determined channel quality indicator, scheduling gain from frequency selectivity, scheduling gain, and bandwidth available for transmission of channel quality indicator; and
   transmit the codebook to at least one subscriber.

5. The computer readable medium of claim 4, wherein in the codebook, a partition between distributed and contiguous sub-channels depends in part on the mobility of the subscribers.

6. The computer-readable medium of claim 1, further comprising instructions which when executed by a computer, cause the computer to:
   adjust a size of the group based in part on bandwidth available for transmission of channel quality indicator.

7. A base station, comprising:
   logic circuitry to request a channel quality indicator (CQI) determination over a group of one or more sub-channels; and logic circuitry to selectively adjust sub-channelization allocation for one or more sub-channels based in part on a received determined channel quality indicator, wherein the determined channel quality indicator represents a CQI of the group, and wherein the sub-channels comprise contiguous sub-carriers and distributed sub-carriers existing simultaneously in a sub-frame or time zone; and logic circuitry to increase a number of contiguous sub-carriers if feedback overhead is within an acceptable limit.

8. A base station as claimed in claim 7, wherein the logic circuitry to request a channel quality indicator comprises logic circuitry to identify a codebook.

9. A base station as claimed in claim 7, wherein the logic circuitry to request a channel quality indicator comprises logic circuitry to identify a parent node.

10. A base station as claimed in claim 7, further comprising:

logic circuitry to provide a codebook of sub-channelization allocations based in part on any of the determined channel quality indicator, scheduling gain from frequency selectivity, scheduling gain, and bandwidth available for transmission of channel quality indicator; and logic circuitry to transmit the codebook to at least one subscriber.

11. A base station as claimed in claim 10, wherein in the codebook, a partition between distributed and contiguous sub-channels depends in part on the mobility of the subscribers.

12. A base station as claimed in claim 7, further comprising:

logic circuitry to adjust a size of the group based in part on bandwidth available for transmission of channel quality indicator.

* * * * *